(12) United States Patent
Thompson et al.

(10) Patent No.: US 9,722,257 B2
(45) Date of Patent: Aug. 1, 2017

(54) METHOD OF ENHANCING ELECTRODES

(75) Inventors: Eric L. Thompson, Livonia, NY (US); Anusorn Kongkanand, West Henrietta, NY (US); Frederick T. Wagner, Fairport, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1410 days.

(21) Appl. No.: 12/719,642

(22) Filed: Mar. 8, 2010

(65) Prior Publication Data

US 2011/0143257 A1 Jun. 16, 2011

Related U.S. Application Data

(63) Continuation-in-part of application No. 12/636,993, filed on Dec. 14, 2009, now Pat. No. 9,287,569.

(51) Int. Cl.
| | |
|---|---|
| *H01M 8/10* | (2016.01) |
| *H01M 4/88* | (2006.01) |
| *B01J 23/42* | (2006.01) |
| *B01J 21/00* | (2006.01) |
| *H01M 4/92* | (2006.01) |
| *H01M 8/1018* | (2016.01) |

(52) U.S. Cl.
CPC ......... *H01M 4/923* (2013.01); *H01M 4/8882* (2013.01); *H01M 4/8892* (2013.01); *H01M 4/8896* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 5,523,181 | A * | 6/1996 | Stonehart et al. | 429/314 |
| 5,998,057 | A | 12/1999 | Koschany et al. | |
| 6,660,680 | B1 * | 12/2003 | Hampden-Smith et al. | 502/180 |
| 7,306,876 | B2 * | 12/2007 | Tani et al. | 429/535 |
| 7,754,644 | B2 * | 7/2010 | Ogawa | 502/185 |
| 7,842,432 | B2 * | 11/2010 | Niu et al. | 429/512 |
| 2004/0234839 | A1 | 11/2004 | Wakizoe et al. | |
| 2005/0255372 | A1 | 11/2005 | Lertola | |
| 2005/0287419 | A1 * | 12/2005 | Kim et al. | 429/40 |
| 2006/0251950 | A1 * | 11/2006 | Prinz et al. | 429/40 |

(Continued)

FOREIGN PATENT DOCUMENTS

| | | |
|---|---|---|
| CN | 1716664 A | 1/2006 |
| CN | 101098010 A | 1/2008 |

(Continued)

OTHER PUBLICATIONS http://sciencewatch.com/nobel/predictions/gold-catalysis.*

(Continued)

*Primary Examiner* — Patrick Ryan
*Assistant Examiner* — Christopher Domone
(74) *Attorney, Agent, or Firm* — BrooksGroup

(57) ABSTRACT

One embodiment includes a method of forming a hydrophilic particle containing electrode including providing a catalyst; providing hydrophilic particles suspended in a liquid to form a liquid suspension; contacting said catalyst with said liquid suspension; and, drying said liquid suspension contacting said catalyst to leave said hydrophilic particles attached to said catalyst.

20 Claims, 6 Drawing Sheets

(56) References Cited

U.S. PATENT DOCUMENTS

2007/0298309 A1* 12/2007 Vyas et al. .................. 429/38
2008/0280169 A1* 11/2008 Niu et al. .................... 429/13

FOREIGN PATENT DOCUMENTS

DE     112006002255 T5    6/2008
EP          1205994 A2    5/2002

OTHER PUBLICATIONS

Chinese Office Action dated Jun. 3, 2013; Applicant: GM Global Technology Operations LLC.; Application No. 201010624993.1; 6 pages.

McBreen, James, Voltametric Studies of Electrodes in Contact with Lonomeric Membranes, Journal of Electrochemical Society, May 1985, pp. 1112-1116.

German Office Action dated Mar. 2, 2017 ; Application No. 10 2010 054 273.3; Applicant: GM Global Technology Operations LLC. ; 7 pages.

\* cited by examiner 10 nm beads: 15μg$_{SiO2}$/cm$^2_{MEA}$
surface roughness ~53 cm$^2_{surf.area}$/cm$^2_{MEA}$ 30 nm beads: 15μg$_{SiO2}$/cm$^2_{MEA}$
surface roughness ~26 cm$^2_{surf.area}$/cm$^2_{MEA}$

METHOD OF ENHANCING ELECTRODES

CROSS-REFERENCE TO RELATED APPLICATIONS

This application is a continuation-in-part of U.S. patent application Ser. No. 12/636,993 filed Dec. 14, 2009 and claims the benefit of the filing date thereof.

TECHNICAL FIELD

The field to which the disclosure generally relates includes thin film electrodes and more particularly to fuel cell electrodes including Proton Exchange Membrane (PEM) nano-structured electrodes.

BACKGROUND

Fuel cells have been demonstrated to be viable for vehicle and stationary applications. However, several problems remain relating to the durability of electrode materials, especially in vehicle applications where proton exchange membrane (PEM) electrode materials are expected to operate under a wide variety of conditions, including relatively dry conditions that may adversely affect operation of the electrode as well as durability and lifetime.

Referring to FIG. 1, is shown a schematic diagram of a conventional fuel cell 10, such as in a vehicle, including an organic membrane 12 with an anode electrode 12A and a cathode electrode 12B. Hydrogen $H_2$ may be converted to 4 protons and 4 electrons at the anode, where the 4 protons may pass through the proton exchange membrane 12 and the 4 electrons may pass through an electrical circuit 14 to the cathode 12B where the 4 protons and 4 electrons may react with oxygen $O_2$ to produce water.

There are several types of electrode catalysts known in the art including catalyst particles (e.g., noble metals including Pt) which are typically supported on carbon substrates, or where a thin film of catalyst is coated as a shell onto a core of another material, including another particle or a whisker (e.g., an elongated rod-like shape). In a conventional electrode, catalyst is mixed with an ionic conduction material, such as perfluorosulfonic acid (PFSA) polymer, in order to conduct proton across the electrode. In an electrode which made from a core-shell catalyst where Pt surface of each particles are in contact with each other, an alternative proton conduction mechanism can be achieved where proton (or adsorbed species) can transport on the surface of Pt. In this case, an additional ionic conduction material (e.g. PFSA) is not required. However, the surface conduction mechanism on Pt is suspected to be highly dependent to the water activity compared to PFSA. (For further discussion of surface transport mechanisms on Pt surfaces see J., McBreen, Journal of Electrochemical Society, May 1985, pp. 1112-6) In consequence, this kind of electrode is likely to suffer in performance in a dry condition.

In this invention, the electrode hydrophilicity was modified by incorporation of hydrophilic particles into the electrode. The higher hydrophilicity results in a higher water activity in the electrode which thus improves the proton (or adsorbed species) conduction via the Pt surface transport mechanism. The hydrophilic particle was design so that it modifies the local water activity close to the Pt surface, and allows sufficient gas transport of the reactant gases to the Pt.

SUMMARY OF EXEMPLARY EMBODIMENTS OF THE INVENTION

In an exemplary embodiment, an electrode is provided including a thin film catalyst; and a plurality of hydrophilic particles dispersed on the thin film catalyst.

In another exemplary embodiment, a method of forming a hydrophilic particle containing electrode is provided including providing a thin film catalyst; providing hydrophilic particles suspended in a liquid to form a liquid suspension; contacting the thin film catalyst with the liquid suspension; and, drying the liquid suspension contacting the thin film catalyst to leave said hydrophilic particles attached to the thin film catalyst.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
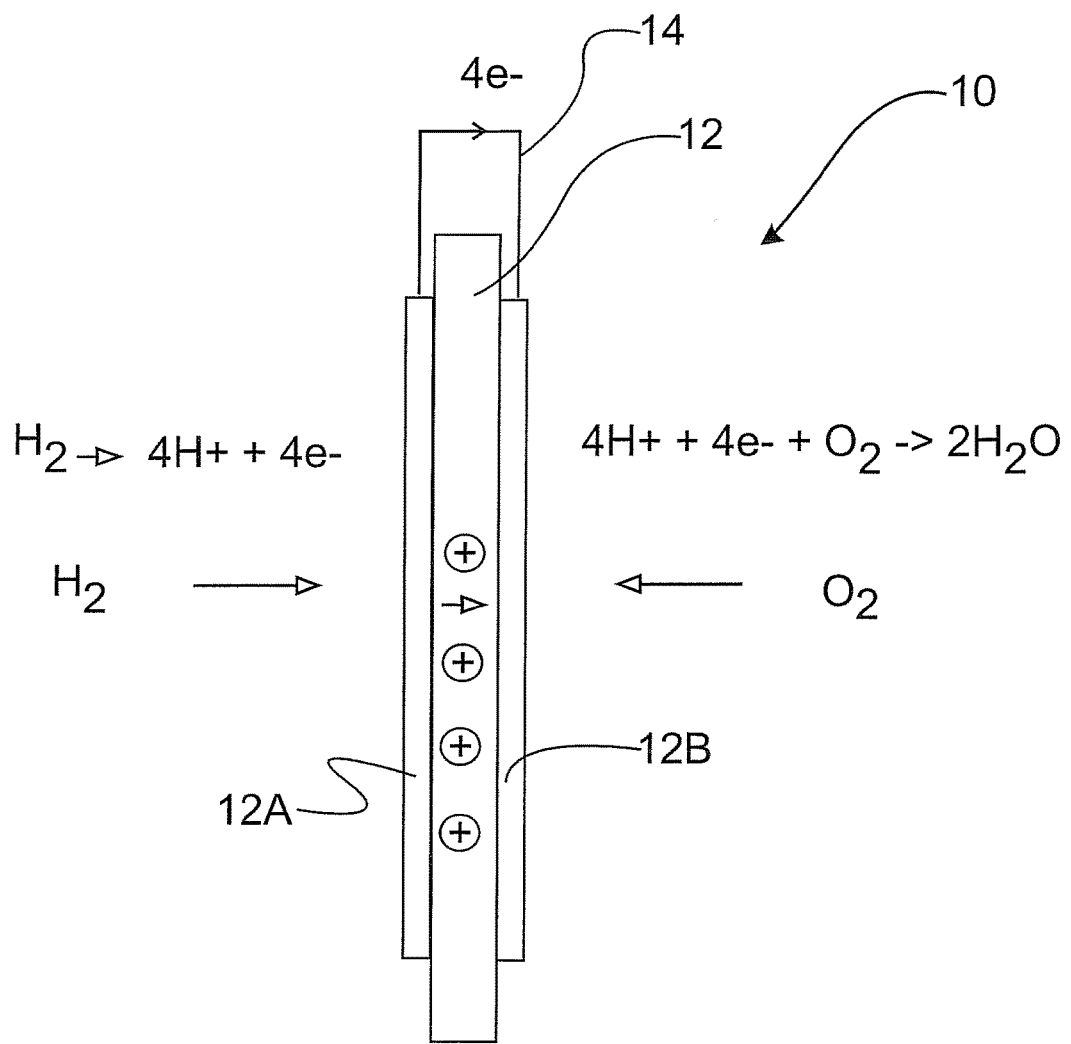
FIG. 1 shows a schematic diagram of a PEM fuel cell, such as a vehicle fuel cell, according to the prior art.

In an exemplary embodiment, hydrophilic particles are provided dispersed on a catalyst where the catalyst forms at least a portion of an electrode. The catalyst may be supported or unsupported. The support may be any of a variety of materials including, but not limited to, carbon or metal oxide structures. The hydrophilic particles may include a hydrophilic surface that attracts and spreads water (allows water to move across the surface). In other exemplary embodiments, the hydrophilic particles may be dispersed as primary particles and/or agglomerates of hydrophilic particles on the thin film catalyst. In another exemplary embodiment, the electrode may be a proton exchange membrane (PEM) fuel cell electrode, such as a vehicle fuel cell as shown in FIG. 1. In another exemplary embodiment, the thin film catalyst may include one or more noble metal catalyst. In another exemplary embodiment, the noble metal may include Pt or an alloy thereof.

In an exemplary embodiment, the hydrophilic particles may be provided in a range of particle sizes, but not limited thereto, which may vary over a primary particle size range of about 1 nm to about 100 nm, more preferably from about 5 nm to about 50 nm, even more preferably, from about 5 nm to about 30 nm. For example, the effective primary particle size may be expressed as volume average particle size or weight average particle size and may be determined by common methods including visually by a transmission electron microscope (TEM), measurement of surface area by gas e.g., $N_2$ adsorption, or x-ray spectroscopy. In an exemplary embodiment, the hydrophilic particles may have surface areas of about 20 $M^2$/g to about 250 $M^2$/g.

Figure 2A:
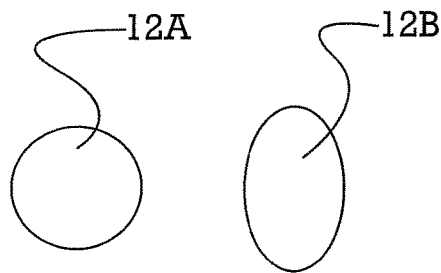
FIGS. 2A-2E show schematic diagrams an exemplary hydrophilic particles and hydrophilic particles on thin film catalysts according to exemplary embodiments.

In another exemplary embodiment, the hydrophilic particles may be provided having a primary particle size which may be within a narrow range, e.g., where the size variation among particles is less than about 20 percent, more preferably less than about 10 percent. Referring to FIG. 2A, in other exemplary embodiments, the hydrophilic particles may be in any shape, including substantially spherical 12A or oval shaped 12B e.g., as well as polyhedral and/or flake-shaped, and may include agglomerates e.g., 14, as shown in FIG. 2B, made up of a plurality of agglomerated smaller particles, e.g., 14A, 14B, 14C, where the smaller particles are either partially bonded or held together by attractive physical forces.

In an exemplary embodiment, the hydrophilic particles may be an oxide, such as a metal oxide, including silicon oxide, titanium oxide, or derivative thereof. For example, the silicon dioxide hydrophilic particles may include hydroxyls (OH groups), e.g., both vicinal and isolated hydroxyls, bonded to the particle surface. The hydrophilic particles may be formed by any process, including chemical processes such as sol-gel processes and/or flame pyrolysis, and may be treated by known chemical processes to achieve desired hydrophilic properties including hydroxyls on the particle surface.

Figure 2B:
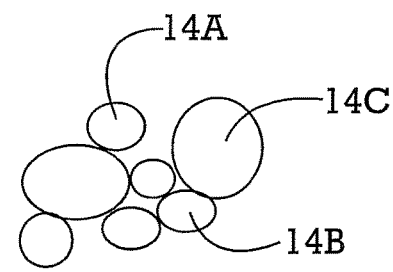
Figure 2C:
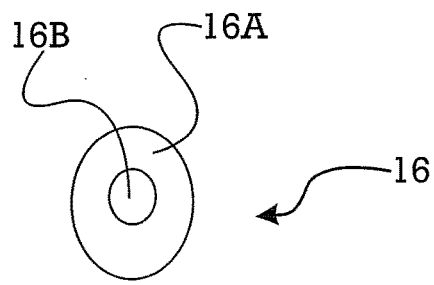

Referring to FIG. 2C, in another exemplary embodiment, the hydrophilic particles e.g., 16 may be provided as a cladding e.g., 16A of hydrophilic material at least partially surrounding a core of one or more second materials e.g., 16B, which may be a metal, and oxide, or an organic material. The hydrophilic particles may be isolated or agglomerated as shown in FIG. 2B.

Figure 2D:
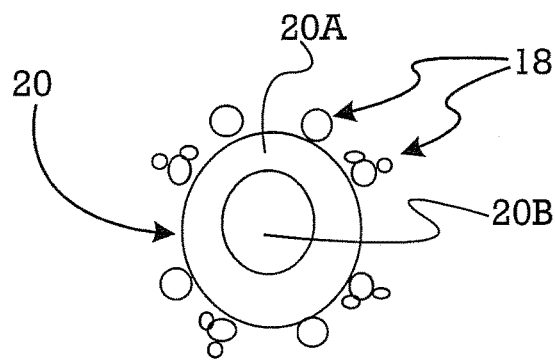

Referring to FIG. 2D, in another exemplary embodiment, the hydrophilic particles e.g., 18 may have any shape including substantially spherical or oval and including one or more of the shapes/configurations shown in FIGS. 2A-2C and may be provided dispersed on the surface of a thin film catalyst e.g., 20A that may be a thin film or cladding of the thin film catalyst material surrounding a core of a second material 20B. In another exemplary embodiment the catalyst 24A may make up the entire particle. In addition, in other exemplary embodiments, the shape of the catalyst particle 20 may be any shape, including substantially spherical or oval shaped e.g., as shown in FIG. 2D, as well as polyhedral and/or flake-shaped as well as rod or whisker or rod shaped as shown below in FIG. 2E. In some embodiments, the hydrophilic particles e.g., 18 and/or the catalyst particles e.g., 20 may further be agglomerated into larger particle agglomerates, and may have a range of particle sizes. For example, in an exemplary embodiment, the catalyst particles e.g., 20 may have a primary particle size from of about 20 nm to about 1 micron and the hydrophilic particles e.g., 18, may have a primary particle size from of about 1 nm to about 100 nm, more preferably from about 1 nm to about 50 nm.

Figure 2E:
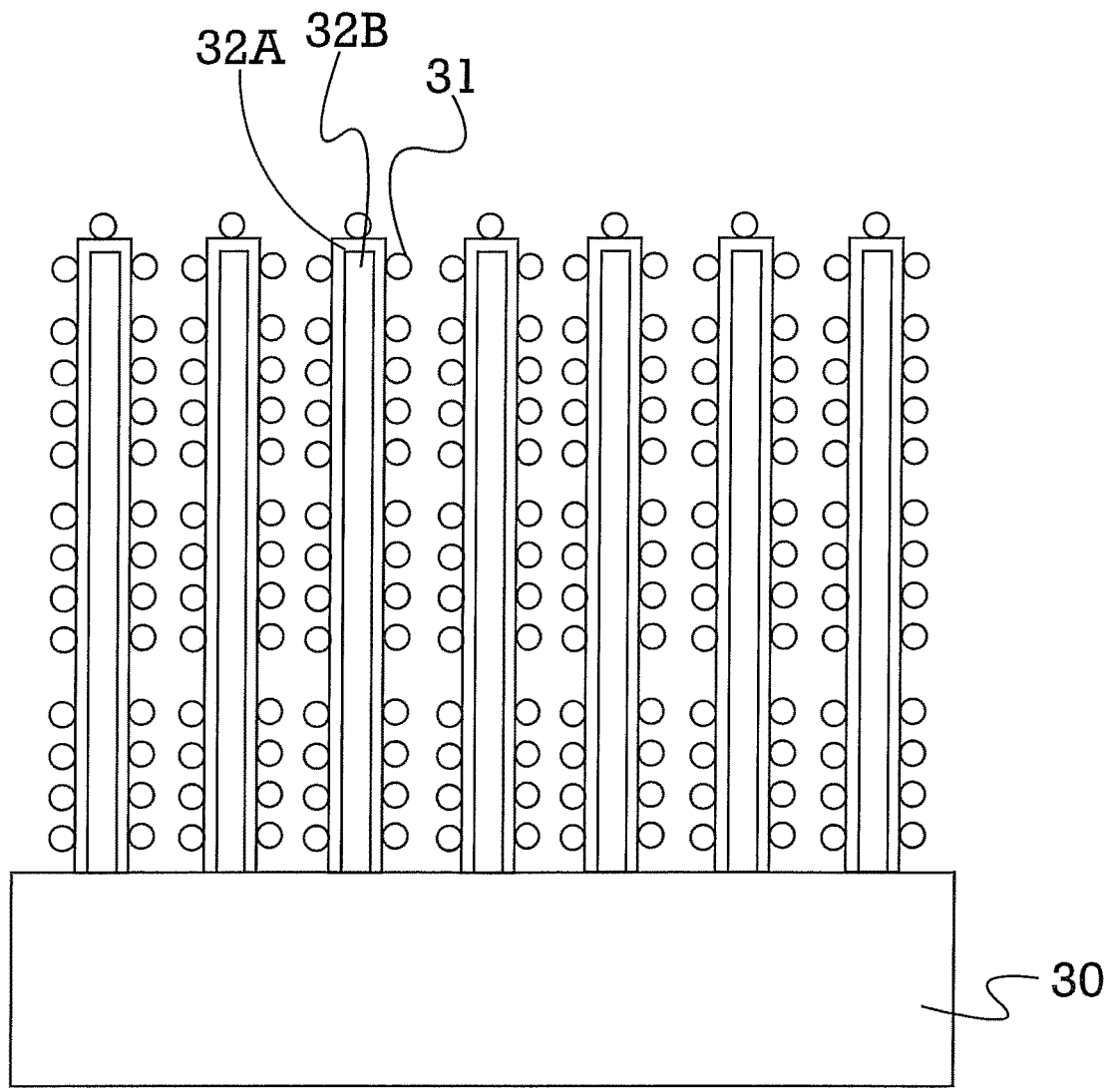

Referring to FIG. 2E, in an exemplary embodiment, the hydrophilic particles e.g., 31, are dispersed onto elongated or whisker shaped thin film catalyst 32A which may be provided covering a whisker shaped support 32B, which may be an organic material as is known in the art. In one exemplary embodiment, the thin film catalyst e.g., 32A may be a noble metal, such as a Pt or Pt alloy coated onto the whisker shaped substrate or support 32B. In another an exemplary embodiment, the thin film catalyst may have a noble metal or noble metal alloy loading of about 0.01 mg/cm2 to about 1 mg/$cm^2$. Other suitable catalyst may include, but are not limited to, Pd or its alloy.

In an exemplary embodiment, a plurality of the whisker shaped carbon supported thin film catalyst e.g., 32A, 32B may be attached to the surface of a substrate 30, such as a membrane of a proton exchange membrane (PEM) electrode, including a PEM electrode of a fuel cell, such as a vehicle fuel cell shown in FIG. 1. In an exemplary embodiment, the PEM may be fluorinated, partially fluorinated or non-fluorinated. In another exemplary embodiment, the thickness of the PEM electrode including the thin film catalyst may be less that 1 micron. In another exemplary embodiment, the thin film catalysts may be high aspect ratio particles such as the whisker shaped supported thin film catalyst e.g., 32A, 32B and may have a width of about 10 to about 100 nm and a length of about 200 to about 1000 nm.

In an exemplary embodiment, the hydrophilic particles may be dispersed onto the thin film catalyst (e.g., 32A whiskers) by suspending the hydrophilic particles in a liquid, such as a polar or non-polar solvent, and contacting the electrode and/or thin film catalyst with the liquid suspension. In one exemplary embodiment, the liquid suspension of hydrophilic particles may be sprayed onto the thin film catalyst using conventional spray methods. In another exemplary embodiment, the liquid suspension of hydrophilic particles may be coated onto the thin film catalyst by contacting a rod covered with the suspension to the thin film catalyst surface. In another exemplary embodiment, liquid suspension of hydrophilic particles may be coated onto the thin film catalyst by forcing the liquid suspension through a slot positioned above and moved over the thin film catalyst surface. It will be appreciated that surface energy forces, including capillary forces may operate to draw the liquid suspension onto the thin film catalyst surface to thereby disperse the hydrophilic particles onto the thin film catalyst surface.

In another exemplary embodiment, the liquid suspension of hydrophilic particles on the thin film catalyst may be allowed to dry to form the hydrophilic particles, e.g., 31 dispersed on the thin film catalyst surface. In an exemplary embodiment, the thin film catalyst with the dispersed hydrophilic particles may be attached to the electrode substrate e.g., PEM membrane 30, either before or following dispersing the hydrophilic particles onto the thin film catalyst surface. In another exemplary embodiment the thin film catalyst with the dispersed hydrophilic particles (e.g., whiskers 32A, 32B) may be hot-pressed onto the electrode substrate e.g., PEM membrane 30, by conventional methods.

In an exemplary embodiment, the thin film catalyst with the dispersed hydrophilic particles (e.g., whiskers 32A, 32B) may be hot-pressed onto the electrode substrate e.g., PEM membrane 30, at a pressing pressure of about 100 psi to about 10000 psi and where the hot-pressing may be at a temperature of about 30 C to about 200 C.

Figure 3A:
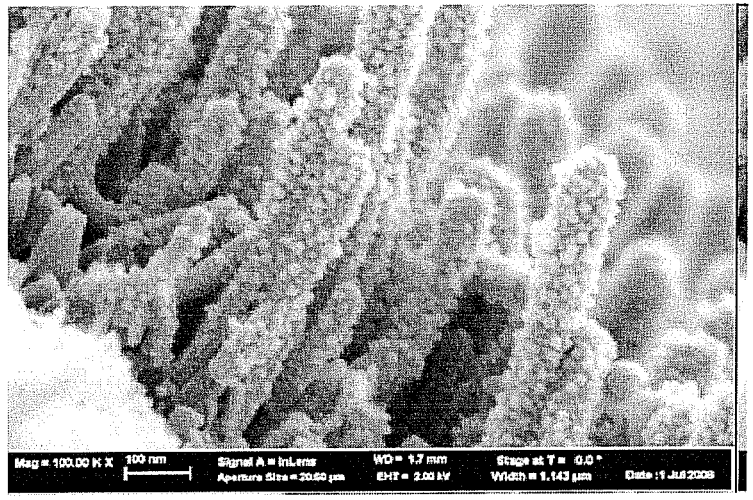
FIGS. 3A-3B show SEM micrographs of exemplary hydrophilic particles on whisker shaped thin film catalysts according to exemplary embodiments.
Figure 3B:
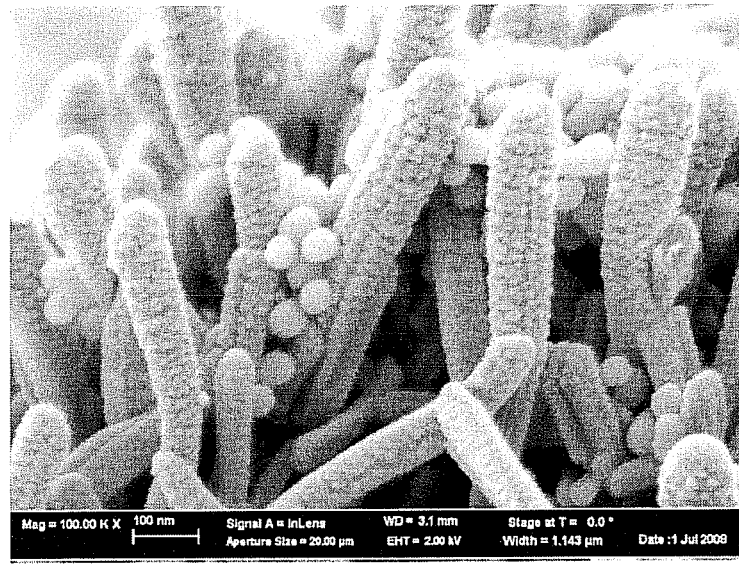

Referring to FIGS. 3A and 3B, in an exemplary embodiment, are shown scanning electron microscope (SEM) micrographs of exemplary dispersed hydrophilic particles on a thin film whisker shaped catalyst. In FIG. 3A are shown $SiO_2$ "beads" having a diameter of about 10 nm in FIG. 3A and in FIG. 3B are shown $SiO_2$ "beads" having a diameter of about 30 nm. The whiskers shown are Nano-Structured Thin Film™ (NSTF) Pt containing catalyst (e.g., a PtMnCo alloy) available from 3M Company. The loading of the $SiO_2$ particles on the thin film whisker shaped catalysts shown in FIGS. 3A and 3B is about 15 micrograms/$cm^2_{MEA}$ where the area $cm^2$ is with respect to a membrane electrode area (MEA) to which the catalyst may be attached. In other exemplary embodiments, the $SiO_2$ particle loading on thin film shaped catalysts including whisker shaped catalysts may be from about 1 micrograms/$cm^2_{MEA}$, to about 30 micrograms/$cm^2_{MEA}$.

In addition, a surface roughness (surface area) may be defined for the hydrophilic particles dispersed on a thin film catalyst with respect to the area of a membrane electrode area (MEA). In FIGS. 3A and 3B the surface roughness may respectively be about 53 $cm^2/cm^2_{MEA}$ and about 26 $cm^2/cm^2_{MEA}$. In other exemplary embodiments, the surface roughness (surface area) of hydrophilic particles (e.g., $SiO_2$ particles) on thin film shaped catalysts including whisker shaped catalysts may be from about 20 $cm^2/cm^2_{MEA}$ to about 75 $cm^2/cm^2_{MEA}$.

Figure 4:
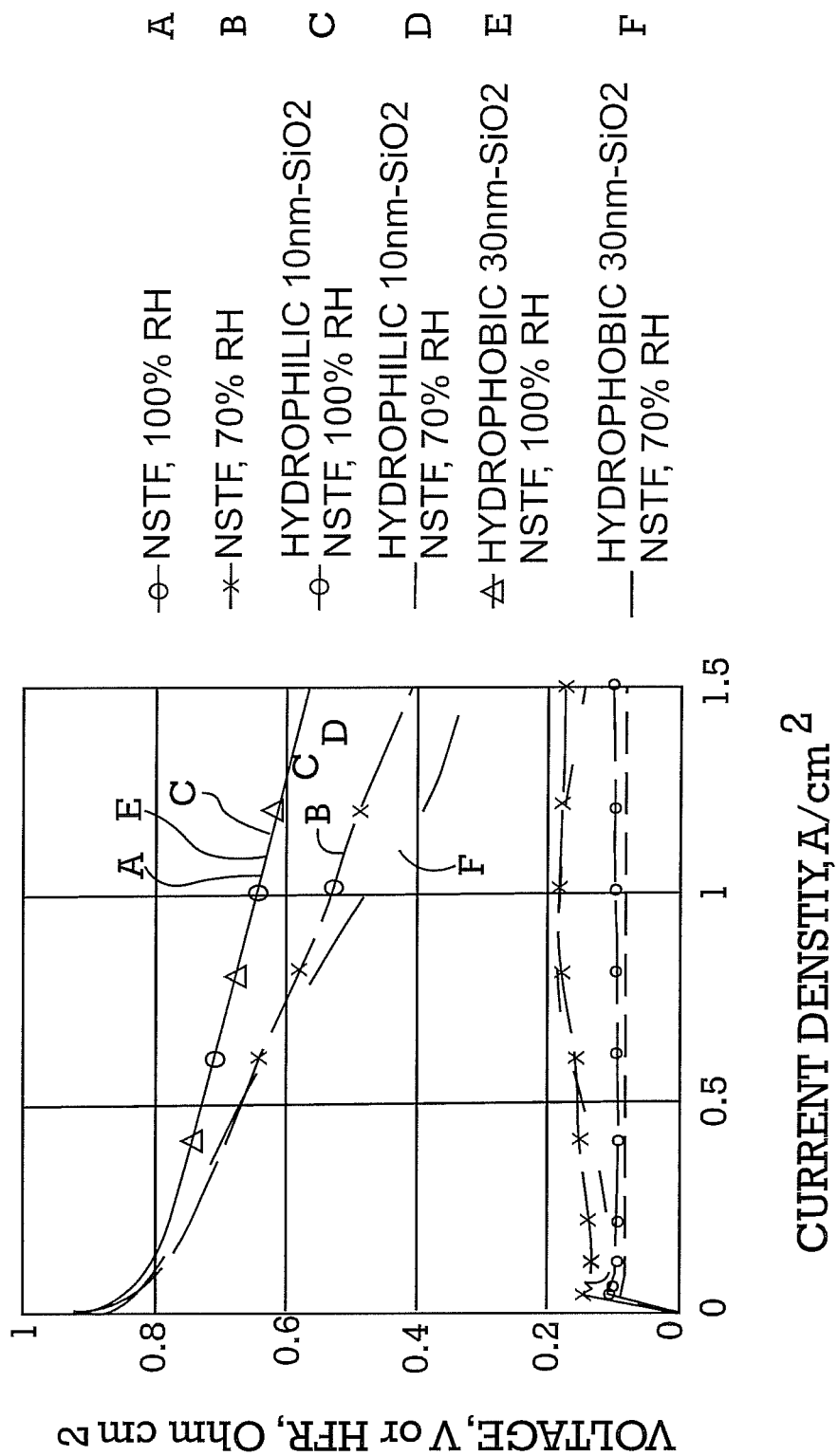
FIG. 4 shows exemplary operational data of exemplary PEM electrode using exemplary hydrophilic particles on whisker shaped thin film catalysts under different humidity conditions.

Referring to FIG. 4, in an exemplary implementation of embodiments, is shown a measured normalized resistance (HFR) 50 or Voltage 52 vs. current density for membrane electrodes including $SiO_2$ loaded (15 micrograms/$cm^2_{MEA}$ on cathode only) and unloaded (without $SiO_2$) NSTF whisker shaped thin film Pt alloy catalysts under different relative humidity (RH) conditions at about 80° C. For example, it is seen that under drier conditions, e.g., 70% RH versus 100% RH, that a significant decrease in performance for the unloaded electrodes (without $SiO_2$ particles) occurs (e.g., lower Voltage at higher current density as indicated by arrow showing change from curve A to B). In contrast, the 10 nm $SiO_2$ loaded electrodes show significantly improved performance under similar drier conditions as indicated by arrow showing change from curve C to D.

While not bound by any particular theory of operation, it is believed that the $SiO_2$ hydrophilic particles act to attract water and spread water to the thin film catalyst surface thereby improving proton (or adsorbed species) conduction via the surface transport mechanism, resulting in improved accessibility to and utilization of the catalyst surface under lower operating relative humidity.

Among the advantages of several embodiments, is the improved performance of electrodes, e.g., PEM electrodes, such as used in fuel cells, including vehicle fuel cells where dry operating environments may be frequently encountered.

Figure 5:
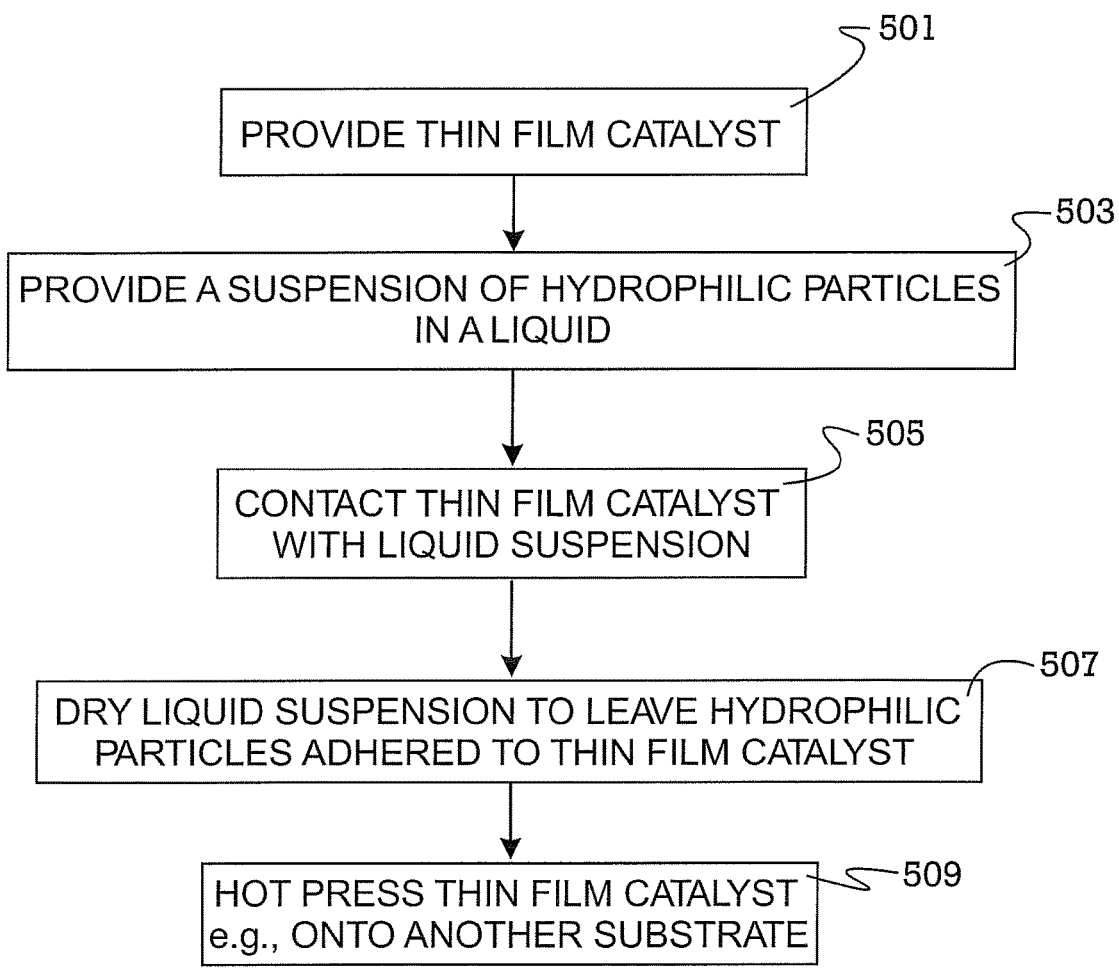
FIG. 5 shows an exemplary process flow to form a hydrophilic particle containing thin film catalyst electrode according to an exemplary embodiment.

Referring to FIG. 5 is a process flow diagram including several exemplary embodiments. In step 501, a thin film catalyst is provided. In step 503 a liquid with a suspension of hydrophilic particles is provided. In step 505 the thin film catalyst surface is contacted with the liquid suspension of hydrophilic particles. In step 507, the liquid suspension contacting the thin film catalyst is dried to leave hydrophilic particles adhered to the surface of the thin film catalyst. In optional step 509, the thin film catalyst and hydrophilic particles may be hot pressed including onto a substrate.

The above description of embodiments of the invention is merely exemplary in nature and, thus, variations thereof are not to be regarded as a departure from the spirit and scope of the invention.

What is claimed is:

1. A product comprising:
an electrode comprising:
catalyst; and
a plurality of hydrophilic particles dispersed on said catalyst.

2. A product as set forth in claim 1, wherein said catalyst comprises a noble metal.

3. A product as set forth in claim 1, wherein said catalyst comprises Pt.

4. A product as set forth in claim 1, wherein said hydrophilic particles comprise hydroxyls bonded to a surface of each of said hydrophilic particles.

5. A product as set forth in claim 1, wherein said hydrophilic particles comprise an oxide.

6. A product as set forth in claim 1, wherein said hydrophilic particles comprise silicon dioxide.

7. A product as set forth in claim 1, wherein said hydrophilic particles have a primary particle size of from about 1 nm to about 50 nm.

8. A product as set forth in claim 1, wherein said catalyst comprises a thin film catalyst comprising an exterior shell of particles having a dimension larger than said hydrophilic particles.

9. A product as set forth in claim 8, wherein said thin film catalyst comprises a plurality of whisker shaped particles wherein at least a shell of said whisker shaped particles comprises said thin film catalyst.

10. A product as set forth in claim 9, wherein said whisker shaped particles comprise a diameter of about 10 to about 250 nm and a length of about 100 nm to about 1 micron.

11. A product as set forth in claim 8, wherein said thin film catalyst is attached to a proton exchange membrane.

12. A product as set forth in claim 1, wherein said electrode comprises a fuel cell proton exchange membrane electrode.

13. A product as set forth in claim 12, wherein said electrode comprises a proton exchange membrane (PEM) electrode comprising a vehicle fuel cell.

14. A product as set forth in claim 1, wherein said electrode comprises a proton exchange membrane (PEM) electrode comprising a vehicle fuel cell wherein the thickness of the PEM electrode is less than 1 micron.

15. A product as set forth in claim 14, wherein the proton exchange membrane (PEM) has a membrane electrode area (MEA), and wherein the hydrophilic particles comprise silicon dioxide and wherein the hydrophilic particle loading on the catalyst is from about 1 micrograms/$cm^2_{MEA}$ to about 30 micrograms/$cm^2_{mEA}$.

16. A product as set forth in claim 15, wherein the proton exchange membrane (PEM) has a membrane electrode area (MEA), and wherein the hydrophilic particles have a surface roughness between about 20 $cm^2/cm^2_{MEA}$ and about 75 $cm^2/cm^2_{MEA}$.

17. A product as set forth in claim 1, wherein the hydrophilic particles have surface areas of about 20 $M^2/g$ to about 250 $M^2/g$.

18. A product comprising:
an electrode comprising:
catalyst; and
a plurality of hydrophilic particles dispersed on said catalyst; wherein the hydrophilic particles have a size variation of less than 20 percent.

19. A product as set forth in claim 18 wherein the hydrophilic particles have a size variation of less than 10 percent.

20. A product comprising:
an electrode comprising:
catalyst; and
a plurality of hydrophilic particles dispersed on said catalyst; wherein the hydrophilic particles are provided as a cladding.

* * * * *